United States Patent
Brown et al.

(10) Patent No.: US 11,200,199 B2
(45) Date of Patent: Dec. 14, 2021

(54) SYSTEM THAT MAINTAINS OBJECTS CREATED AND MODIFIED WITHIN DESIGNATED DIRECTORIES ON A PER-CLIENT BASIS IN A NETWORK FILESYSTEM

(71) Applicant: International Business Machines Corporation, Armonk, NY (US)

(72) Inventors: William B. Brown, Austin, TX (US); Duen-wen Hsiao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 15/372,258

(22) Filed: Dec. 7, 2016

(65) Prior Publication Data

US 2017/0091209 A1    Mar. 30, 2017

Related U.S. Application Data

(63) Continuation of application No. 12/425,376, filed on Apr. 16, 2009, now Pat. No. 9,524,396.

(51) Int. Cl.

| G06F 16/10 | (2019.01) |
| G06F 16/13 | (2019.01) |
| G06F 16/18 | (2019.01) |
| G06F 16/20 | (2019.01) |
| G06F 16/11 | (2019.01) |
| G06F 21/62 | (2013.01) |
| H04L 29/08 | (2006.01) |

(52) U.S. Cl.
CPC .............. *G06F 16/13* (2019.01); *G06F 16/10* (2019.01); *G06F 16/119* (2019.01); *G06F 16/18* (2019.01); *G06F 16/20* (2019.01); *G06F 21/6218* (2013.01); *H04L 67/1097* (2013.01)

(58) Field of Classification Search
CPC ......... G06F 17/30091; G06F 17/30182; G06F 16/10; G06F 16/119; G06F 21/6218
See application file for complete search history.

(56) References Cited

U.S. PATENT DOCUMENTS

| 5,742,817 | A | 4/1998 | Pinkoski |
| 5,838,910 | A | 11/1998 | Domenikos et al. |
| 6,327,608 | B1 | 12/2001 | Dillingham |
| 6,775,679 | B2 | 8/2004 | Gupta |
| 7,433,876 | B2 * | 10/2008 | Spivack ................ G06F 16/958 |
| 7,475,199 | B1 | 1/2009 | Bobbitt et al. |
| 7,860,907 | B2 | 12/2010 | Worrall |
| 8,224,877 | B2 | 7/2012 | Barrall et al. |
| 9,524,396 | B2 * | 12/2016 | Brown ................... G06F 16/10 |
| 2001/0051955 | A1 | 12/2001 | Wong |

(Continued)

*Primary Examiner* — Marcin R Filipczyk
(74) *Attorney, Agent, or Firm* — Scott S. Dobson

(57) ABSTRACT

Systems that maintain objects created and modified within designated directories on a per-client basis in a network filesystem include a file server having a local processor, memory operably connected to the local processor, a filesystem including main directories loaded into the memory, and a list of operations loaded into the memory. At least one client is operably connected to the server having a remote processor and memory operably connected to the remote processor. The file server has designated at least one of the main directories as a per-client writable directory, and the file server exports the filesystem read-only to at least one client.

4 Claims, 3 Drawing Sheets

(56) References Cited

U.S. PATENT DOCUMENTS

| | | |
|---|---|---|
| 2007/0055864 A1 | 3/2007 | Tock et al. |
| 2007/0266027 A1* | 11/2007 | Gattegno ............ H04L 67/1097 |
| 2007/0271350 A1 | 11/2007 | Kazar et al. |
| 2008/0109394 A1* | 5/2008 | Havens ................. G06F 16/235 |
| 2008/0281908 A1* | 11/2008 | McCanne ......... G06F 17/30156 |
| | | 709/203 |
| 2009/0077087 A1 | 3/2009 | Urano et al. |
| 2009/0106264 A1* | 4/2009 | Takahashi ............... H04L 67/06 |
| 2010/0121893 A1 | 5/2010 | Uhrhane et al. |

\* cited by examiner

SYSTEM THAT MAINTAINS OBJECTS CREATED AND MODIFIED WITHIN DESIGNATED DIRECTORIES ON A PER-CLIENT BASIS IN A NETWORK FILESYSTEM

BACKGROUND

The present invention relates to a system that maintains objects created and modified within designated directories on a per-client basis in a network filesystem. Diskless clients are growing in popularity because they do not require any local hard disk space to operate. They boot over a network and run entirely using network-based filesystems. Because the applications and operating system are stored on a server, they do not have to be duplicated on each client. This centralization also makes it easy to change client configurations because all of the relevant files are stored on the server. Configuration changes can be made even when the client is not running.

Furthermore, because all applications run on the server, low-end client hardware is sufficient for good performance. A high-end server and multiple low-end clients are typically much less expensive than using a midrange server and midrange clients.

However, when a network file system (NFS) is used to support a large number of diskless clients, there are filesystems that are large and mostly read-only. Unfortunately, even when only a small amount of the filesystem must be writable by the clients, this forces the entire filesystem to be replicated for each client.

SUMMARY

One embodiment of the present invention is a method of maintaining objects created and modified within designated directories on a per-client basis in a network filesystem. An embodiment of the invention may also include providing a file server having a local processor, memory operably connected to the local processor, a filesystem including main directories loaded into the memory, and a list of operations loaded into the memory; providing at least one client operably connected to the server having a remote processor and memory operably connected to the remote processor; designating at least one of the main directories as a per-client writable directory; exporting the filesystem read-only to at least one client; responsive to a client requesting to read a file, the server determining if the file is designated to be in a per-client writable directory; and responsive to the server determining the requested file is designated to be in a per-client writable directory, the server returning the requested file to the client from the per-client writable directory. An embodiment of the invention may also include responsive to a client requesting to write a file, the server determining if the file is designated to be in a per-client writable directory; and responsive to the server determining the requested file is designated to be in a per-client writable directory, the server writing the requested file to the filesystem in the designated per-client writable directory.

According to one embodiment of the present invention, a system that maintains objects created and modified within designated directories on a per-client basis in a network filesystem includes a file server having a local processor, memory operably connected to the local processor, a filesystem including main directories loaded into the memory, and a list of operations loaded into the memory; at least one client operably connected to the server having a remote processor and memory operably connected to the remote processor; wherein the file server has designated at least one of the main directories as a per-client writable directory; wherein the file server has exported the filesystem read-only to at least one client; wherein responsive to a client requesting to read a file, the operations instruct the server to determine if the file is designated to be in a per-client writable directory; and wherein responsive to the server determining the requested file is designated to be in a per-client writable directory, the operations instruct the server to return the requested file to the client from the per-client writable directory. An embodiment of the invention may also include wherein responsive to a client requesting to write a file, the operations instruct the server to determine if the file is designated to be in a per-client writable directory; and wherein responsive to the server determining the requested file is designated to be in a per-client writable directory, the operations instruct the server to write the requested file to the filesystem in the per-client writable directory.

According to one embodiment of the present invention, a computer program product for maintaining objects created and modified within designated directories on a per-client basis in a network filesystem includes a computer readable medium; first program instructions to designate at least one main directory on a file server having a plurality of main directories comprising a filesystem as a per-client writable directory; second program instructions to export the filesystem read-only to at least one client operably connected to the file server; third program instructions for the file server to determine responsive to a client requesting to read a file if the file is designated to be in a per-client writable directory; and fourth program instructions for the file server to return the requested file to the client from the per-client writable directory responsive to the file server determining the requested file is designated to be in a per-client writable directory.

DETAILED DESCRIPTION

Figure 1:
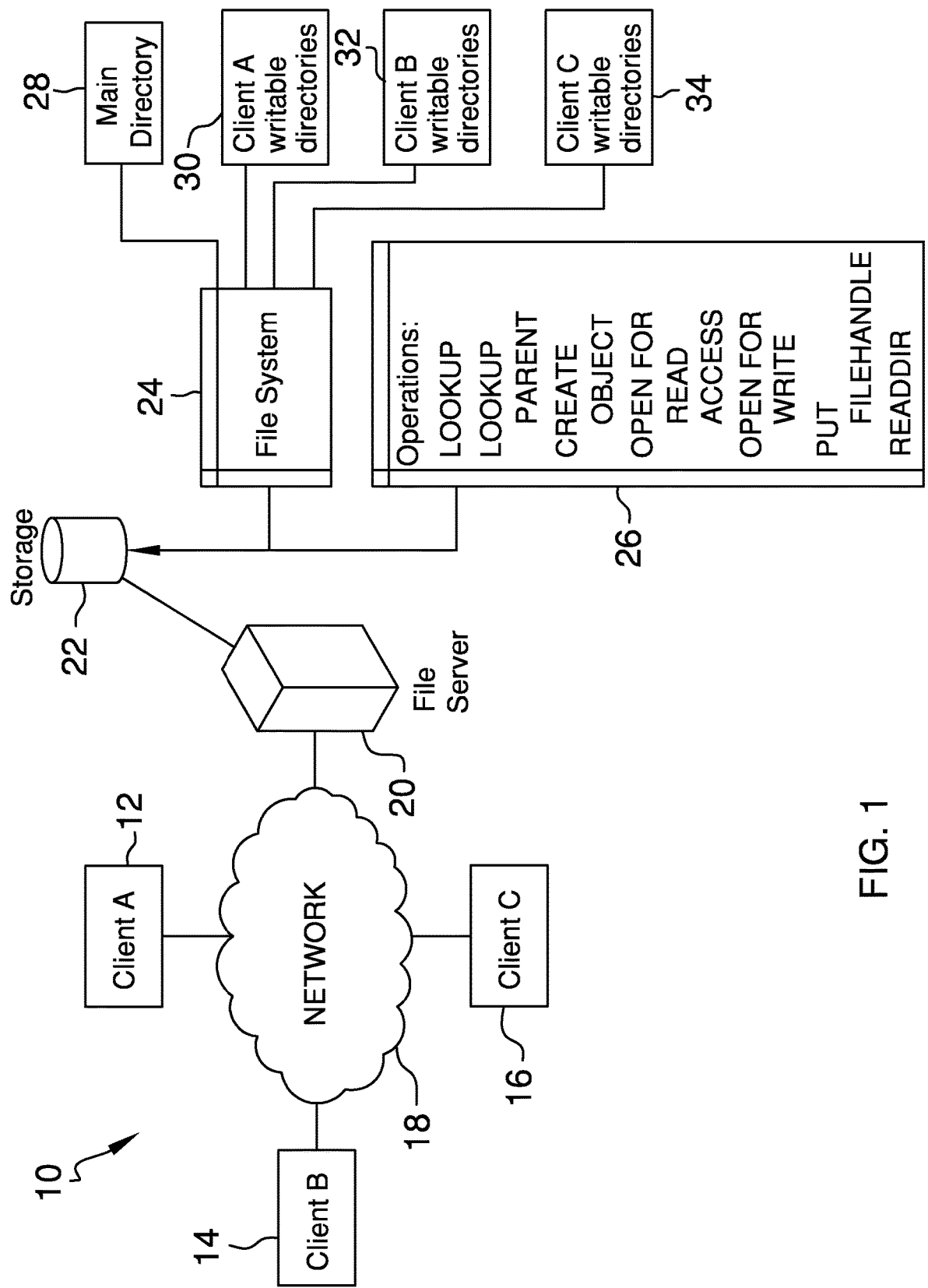
FIG. 1 is a schematic view of an embodiment of a system that maintains objects created a modified within designated directories on a per-client basis in a network filesystem constructed in accordance with the principles of the present invention.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable mediums may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium may even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc. The medium may be remote to the user, thus allowing the use of the program over a large area computer network, including a global network such as the Internet.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), whether via wireless, wireline or other transmission means.

An embodiment of the present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Because the applications and operating system of a network file system (NFS) are not typically configured by the clients, nearly the entire network filesystem is read-only. Unfortunately, in order to enable any portion of the filesystem to be writable by the clients, conventional approaches require the entire filesystem to be replicated for each client. This creates considerable demand for storage resources on the server when each instance of the network filesystem is large. In order to avoid replicating the entire network file system for each client, the current invention modifies the NFS server to allow a filesystem to be exported read-only while designating specific directories that are writable by the clients. The server maintains the objects created and modified within the designated directories by each client.

Referring now to FIG. 1, an embodiment of the system that maintains objects created and modified within designated directories on a per-client basis in a network filesystem 10 is illustrated. More particularly, the embodiment of the system 10 includes at least one client (represented by Client A 12, Client B 14, and Client C 16) connected by a network 18 to a file server 20. In the current embodiment, file server 20 uses an NFS filesystem 24, but any distributed file system can be used as long as the file server can be modified to redirect requests on a per-client basis.

In the current invention, the file server is modified to allow the main directories 28 of the filesystem to be exported read-only while designating specific directories 30, 32, and 34 that are writable by the clients. The filesystem is exported read-only by administrative action on the file server. For NFS, this is accomplished by adding the "ro" option to the export resord in the /etc/exports file. The server then maintains the objects created and modified within the designated client-writable directories on a per-client basis. This is also achieved by administrative action on the server, which could result from the addition of an entry for each client-writable directory with a special option in the /etc/exports file.

Each client sees the common data in the main directories along with the files which it has created/modified in its own designated client-writable directory. Clients will not see objects created/modified by other clients. This allows the server to maintain one master copy of the filesystem, which also contains the per-client data.

The filesystem will be designated as containing per-client-writable directories when it is exported. Any attempt to modify or create objects in directories which are not designated as per-client-writable will result in an error returned to the client. For the per-client-writable (or "main") directories, the server will intercept write/create requests from the clients and create a per-client subdirectory (the "private directory") for each client which has attempted to modify the contents of the directory. The contents of the client's private directory will be treated as contents of the main directory when processing requests from that client.

The operations 26 involved to accomplish the preceding, which provides limited write access to read-only NFS exported filesystems, are:

LOOKUP: The private directories will not be visible to any client (even to the client associated with the private directory). When looking up a file in the main directory, the server will first look in the main directory for the file. If it is found, the filehandle for that file will be returned. If it is not found, the server will then look in the client's private directory. If the client's private directory exists and the file is found there, the filehandle of that file will be returned. If the file does not exist in either the main or the private directory, an error is returned as normal.

LOOKUP PARENT: If the filehandle being operated upon is a subdirectory of the client's private directory, the result will be the parent directory of the main directory.

CREATE OBJECT: The object is created in the client's private directory (if needed, the private directory is created).

OPEN FOR READ ACCESS: If the file exists in the clients private directory it will be used, otherwise the file in the main directory will be used.

OPEN FOR WRITE: If the file exists in the client's private directory it will be used; otherwise, the file in the main directory will be copied to the private directory, and that copy will be used. If the file is copied, the server will add an entry to a control file in the private directory which contains a mapping of the filehandles of the main directory to the filehandles in the private directory.

PUT FILEHANDLE: All filehandles returned for objects in the main directory will contain a flag which indicates the file may have a per-client alternate. The filehandle will also contain an indicator of the main directory. All filehandles for objects created by the client in the private directory will contain a flag which indicates the file was created as a per-client object as well as an indicator of the main directory. When presented with a filehandle for an object in the main directory, the server will check the control file in the client's private directory to see if an alternate has been created. If so, the server will use the file in the private directory as the current file.

READDIR: The server will need to make two readdir requests to the physical filesystem: one for the main directory, and one for the private directory. The readdir reply from the main directory will need to be scanned to remove the entries for the private directories. If the client has no private directory, the processing can continue as normal. If the client has a private directory, the readdir entries for the main directory will be scanned to see if any of those entries also appear in the private directory. If so, the file in the private directory will need to be used when fetching attributes for the readdir reply. Finally, all files which appear in the private directory that do not appear in the main directory (except for the filehandle control file) will need to be added to the directory listing of the main directory. The offsets for these files will be offset by the final offset of the directory entry for the main directory.

An example of this approach is as follows: the main directory /usr is being shared by many clients, and some clients need to modify the file /usr/lib/security/methods.cfg, which is located in the directory /usr/lib/security. The server could be set up to mark the directory /usr/lib/security as a per-client-writable directory, and the clients that wish to modify the file methods.cfg would be able to do so. The conventional alternative would be to either replicate the /usr filesystem for the different clients or to use links to redirect the files to a filesystem that is writable by the client. The advantage of creating per-client writable directories is storage savings resulting from not replicating the filesystem and ease of management resulting from an administrator only needing to know which directories the clients may need to write to instead of knowing the full list of files and creating the links.

Figure 2:
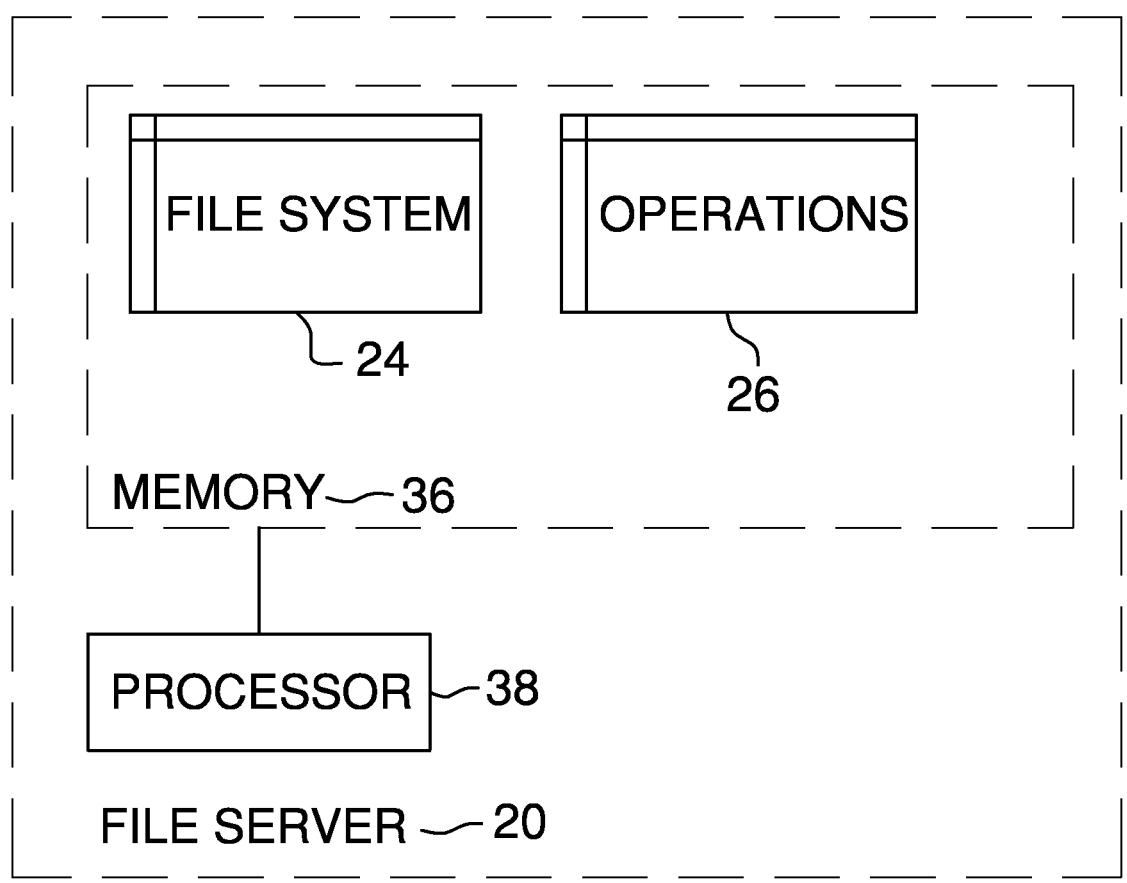
FIG. 2 is a schematic view of an embodiment of a file server of the present invention.

Referring now to FIG. 2, an embodiment of the file server 20 is illustrated. More particularly, the file server 20 has a processor 38 that is operably connected to a memory module 36. The memory module 36 stores the filesystem 24 and operations 26. Each operation is a set of programmatic instructions that instruct the processor how to interact with the filesystem.

Figure 3:
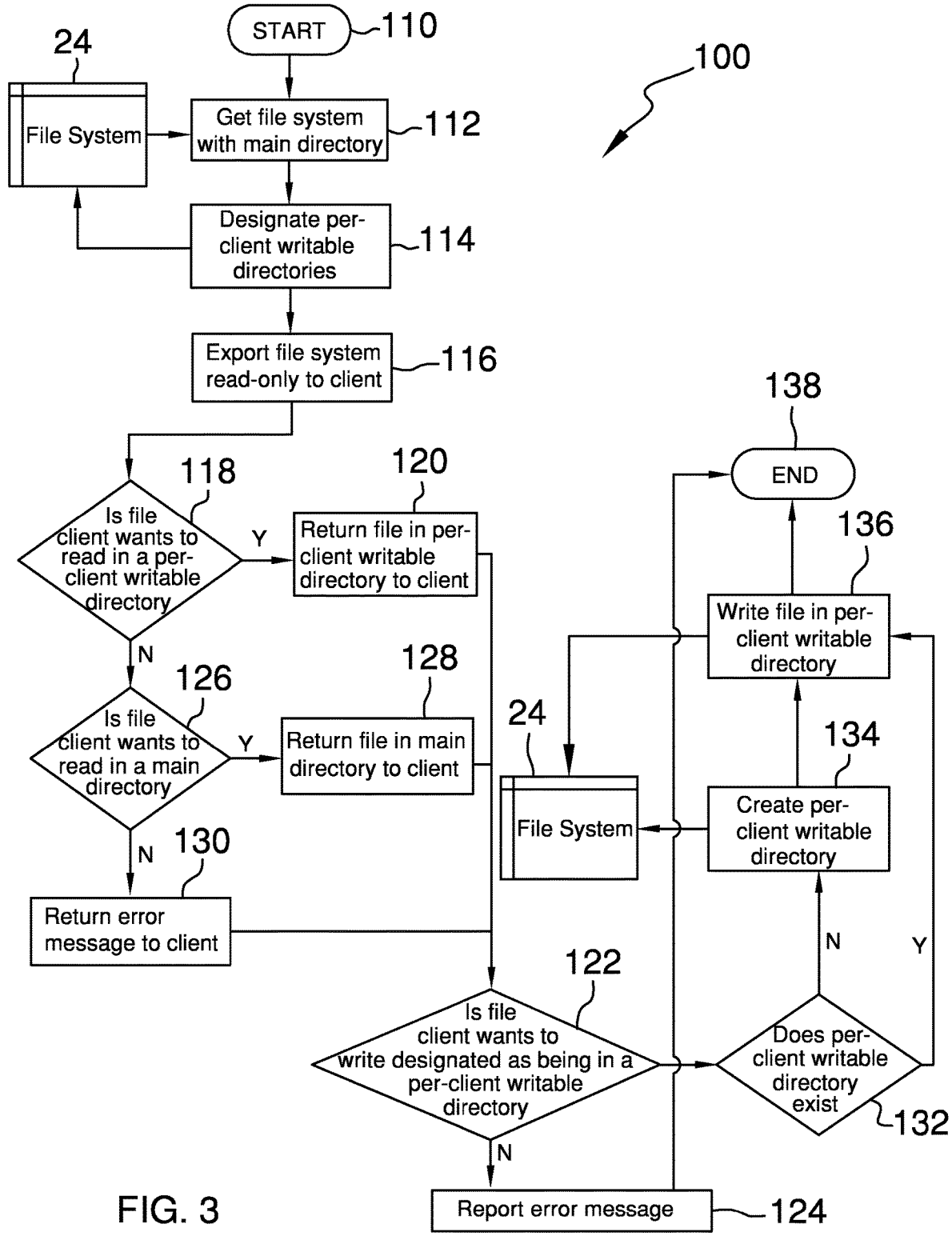
FIG. 3 is a flow chart of an embodiment of a method that maintains objects created a modified within designated directories on a per-client basis in a network filesystem of the present invention.

Referring now to FIG. 3, an embodiment of the method of maintaining objects created and modified within designated directories on a per-client basis in a network filesystem 100 is illustrated. The flowchart of the method begins (110) by obtaining the filesystem with main directories (112). Subsequently, per-client writable directories are designated in the file system (114). Then, the filesystem is exported read-only to at least one client (116).

When a client requests to read a file, it is determined if the file is in a per-client writable directory (118). If it is, the file is returned from the per-client writable directory to the client (120). If it is not, it is determined if the file the client wants to read is in a main directory (126). If it is, the file is returned from the main directory to the client (128). If it is not, an error message is returned to the client (130).

When a client requests to write a file, it is determined if the file is designated as being in a per-client writable directory (122). If it is not, an error message is returned to the client (124). If it is, it is determined if the per-client writable directory exists (132). If the per-client writable directory does not exist, it is created (134). Then, the file is written to the per-client directory in the file system (136) prior to ending (138).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for maintaining objects created and modified within designated directories on a per-client basis in a network filesystem comprising:
    a non-transitory computer readable medium having computer readable program code embodied therewith, the computer readable program code comprising:
        first program instructions to designate at least one main directory on a file server having a plurality of main directories forming a file system as a per-client writable directory;
        second program instructions to export the file system read-only to at least one client operably connected to the file server;
        third program instructions to, responsive to a client requesting to write a file, determine if the file is designated to be in a per-client writable directory;
        fourth program instructions to, responsive to the server determining the requested file is designated to be in a per-client writable directory, determine whether a private directory for the client exists;
        fifth program instructions to, responsive to determining that a private directory for the client exists, write the requested file to the filesystem in the private directory;
        sixth program instructions to flag the file in the main directories as having a per-client alternate; and
        seventh program instructions to perform a READDIR operation including:
            issuing a first readdir request to the main directory;
            issuing a second readdir request to the private directory; and
            combining a reply from the first readdir request and the second readir request.

2. The computer program product of claim 1, further comprising eighth program instructions to, responsive to the server determining that a private directory for the client does not exist, create a private directory in the file system for the client before writing the requested file to the filesystem.

3. The computer program product of claim 1, further comprising eighth program instructions to determine whether the requested file exists in the private directory of the client.

4. The computer program product of claim 3, further comprising ninth program instructions to, responsive to determining that the file does not exist in the private directory of the client, copy a file from the main directory to the private directory and write the requested file to the private directory from the copied file.

* * * * *